United States Patent
Cottet

(10) Patent No.: US 9,248,906 B2
(45) Date of Patent: Feb. 2, 2016

(54) METHOD AND APPARATUS FOR CHANGING A DEPLOYED POSITION FOR A TAIL SKID ASSEMBLY

(71) Applicant: The Boeing Company, Chicago, IL (US)

(72) Inventor: Justin Duane Cottet, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 1 day.

(21) Appl. No.: 14/340,521

(22) Filed: Jul. 24, 2014

(65) Prior Publication Data
US 2015/0102165 A1    Apr. 16, 2015

Related U.S. Application Data

(62) Division of application No. 13/416,914, filed on Mar. 9, 2012, now Pat. No. 8,851,419.

(51) Int. Cl.
| | |
|---|---|
| *B64C 25/00* | (2006.01) |
| *B64C 25/32* | (2006.01) |
| *B64C 25/52* | (2006.01) |
| *B64C 25/58* | (2006.01) |

(52) U.S. Cl.
CPC ............... *B64C 25/32* (2013.01); *B64C 25/52* (2013.01); *B64C 25/58* (2013.01); *B64C 2025/005* (2013.01)

(58) Field of Classification Search
CPC ........ B64C 25/32; B64C 25/58; B64C 25/52; B64C 2025/005
See application file for complete search history.

(56) References Cited

U.S. PATENT DOCUMENTS

| | | | | |
|---|---|---|---|---|
| 3,163,381 | A | * 12/1964 | Pinsker | B64C 25/00 244/100 R |
| 4,815,678 | A | * 3/1989 | Gawne | B64C 25/00 244/100 R |
| 5,927,646 | A | 7/1999 | Sandy et al. | |
| 6,845,944 | B2 | 1/2005 | Bays-Muchmore et al. | |
| 2004/0200930 | A1 | 10/2004 | Bays-Muchmore et al. | |
| 2013/0233970 | A1 | 9/2013 | Cottet | |

FOREIGN PATENT DOCUMENTS

| | | | | |
|---|---|---|---|---|
| EP | 0319051 A2 | 6/1989 | | |
| GB | 462963 A1 | * 3/1937 | | B64C 25/50 |

OTHER PUBLICATIONS

Extended European Search Report, dated Jul. 22, 2013, regarding Application No. EP13158296.7, 6 pages.
Office Action, dated Jan. 2, 2014, regarding U.S. Appl. No. 13/416,914, 11 pages.
Notice of Allowance, dated Jun. 2, 2014, regarding U.S. Appl. No. 13/416,914, 7 pages.

* cited by examiner

*Primary Examiner* — Brian M O'Hara
*Assistant Examiner* — Michael Kreiner
(74) *Attorney, Agent, or Firm* — Yee & Associates, P.C.

(57) ABSTRACT

A method and apparatus for positioning a tail skid assembly for a maximum rotation angle for an aircraft may be provided. A determination may be made as to whether the tail skid assembly is to be deployed for takeoff or landing. A set of parameters may be identified based on a determination of whether the tail skid assembly is to be deployed for takeoff or landing. A desired maximum rotation angle for the aircraft may be identified using the set of parameters. The tail skid assembly may be deployed to allow the desired maximum rotation angle for the aircraft.

20 Claims, 13 Drawing Sheets

FIG.11

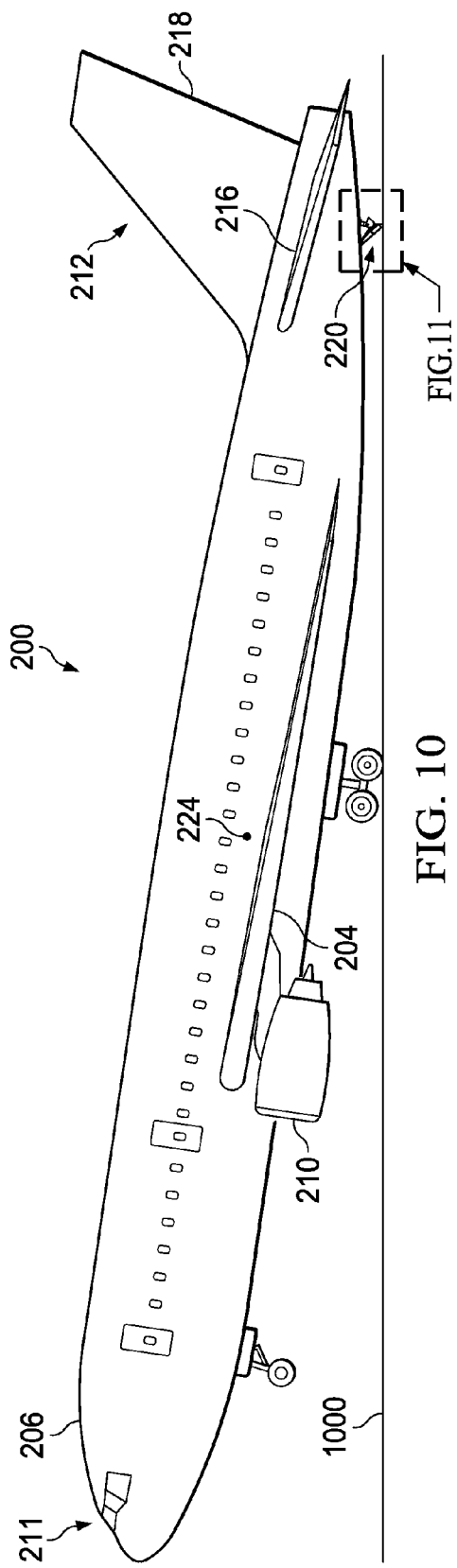
FIG. 10
FIG. 11
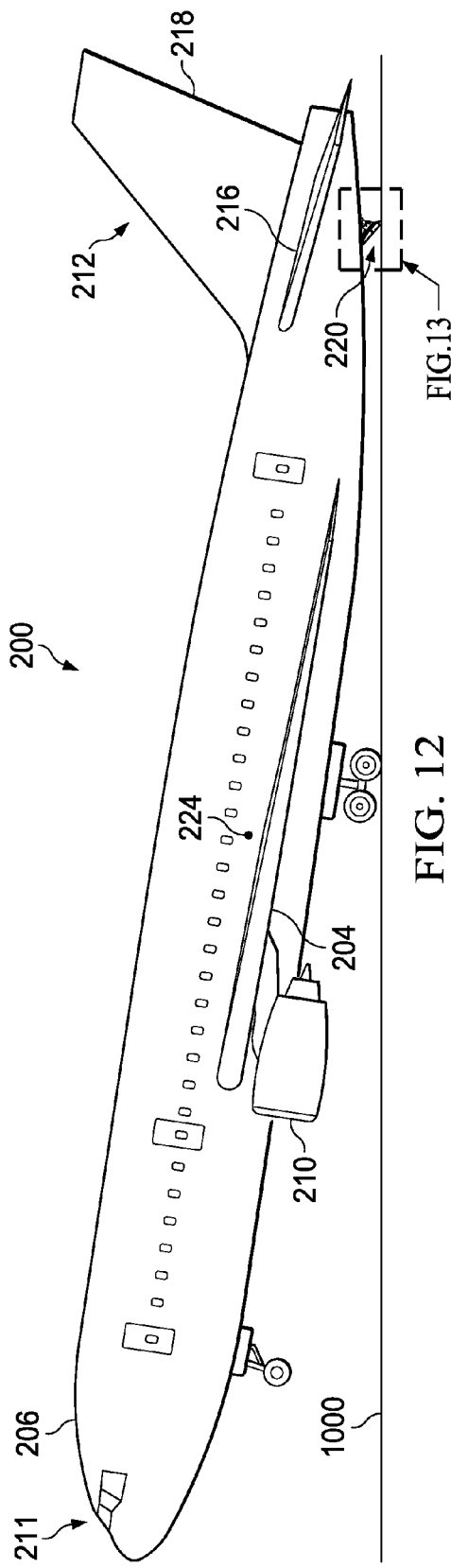
FIG. 12
FIG. 13

METHOD AND APPARATUS FOR CHANGING A DEPLOYED POSITION FOR A TAIL SKID ASSEMBLY

This application is a divisional of U.S. patent application Ser. No. 13/416,914, filed Mar. 9, 2012, which is incorporated by reference herein in its entirety.

BACKGROUND INFORMATION

1. Field

The present disclosure relates generally to aircraft rotation during takeoff and landing and, in particular, to a method and apparatus for changing a maximum rotation angle for an aircraft during takeoff and landing.

2. Background

Rotation of an aircraft about a pitch axis through the aircraft during takeoff or landing may cause a tail section of the aircraft to come into contact with a surface from which the aircraft is taking off or a surface on which the aircraft is landing. A tail skid assembly attached to the underside of the tail section of an aircraft may be used to substantially prevent the tail section of the aircraft from coming into contact with a surface from which the aircraft is taking off or a surface on which the aircraft is landing.

In this manner, the surface may come into contact with the tail skid assembly before coming into contact with the underside of the tail section of the aircraft. Further, the tail skid assembly may comprise a shock absorber that absorbs and/or dissipates the energy generated in response to contact between the end of the tail skid assembly and the surface.

The maximum angle at which the aircraft may rotate about the pitch axis before the tail skid assembly comes into contact with the surface may be referred to as a "maximum rotation angle" for the aircraft. The maximum rotation angle desired for an aircraft during takeoff may be different from the maximum rotation angle desired for the aircraft during landing.

The maximum rotation angle desired at takeoff and landing may be determined based on the amount of energy generated when the tail skid assembly comes into contact with the surface, the amount of energy that can be absorbed and/or dissipated by the shock absorber in the tail skid assembly, a length of the aircraft, a distance between an end of the tail skid assembly and the bottom of a tail section of the aircraft, and/or other types of factors. Other factors may include, for example, without limitation, a change in the weight of the aircraft between takeoff and landing, reduced fuel weight due to fuel consumption, landing speed, takeoff speed, takeoff and/or landing requirements specific to a particular airport, landing field length (LFL), and takeoff field length (TOFL).

For example, an aircraft may have a lower weight at the time of landing as compared to the weight of the aircraft at the time of takeoff. This reduction in weight may be the result of, for example, without limitation, fuel consumption during flight, the dropping of cargo during flight, and/or other suitable factors.

With this reduced weight for the aircraft, the energy generated when an end of a tail skid assembly for the aircraft contacts the surface on which the aircraft is landing may be less than the energy generated during takeoff when the aircraft does not have the reduced weight. The lower energy generated during landing may allow the aircraft to have a greater maximum rotation angle during landing as compared to takeoff.

Additionally, an aircraft may have different ground clearance requirements when taking off as compared to landing. As used herein, the "ground clearance" for an aircraft may be the distance between the undermost portion of a tail skid assembly for the aircraft that is configured to come into contact with a surface and an underside of the tail section of the aircraft. The ground clearance needed by an aircraft during landing may be less than the ground clearance needed during takeoff.

Further, a lower ground clearance may allow the speed of the aircraft to be reduced to a desired speed during landing as compared to a greater ground clearance. A lower ground clearance may allow a greater maximum rotation angle for the aircraft as compared to a greater ground clearance.

With some currently available aircraft, the maximum rotation angle for the aircraft may not be adjusted between takeoff and landing. Therefore, it would be desirable to have a method and apparatus that takes into account at least some of the issues discussed above as well as possibly other issues.

SUMMARY

In one illustrative example, a tail skid assembly may comprise an elongate structure and a deployment device. The elongate structure may be connected to a tail section of an aircraft. The deployment device may be connected to the elongate structure. The deployment device may be configured to move such that a deployed position for the elongate structure changes to one of a plurality of deployed positions for the elongate structure.

In another illustrative example, a tail skid assembly may comprise an elongate structure and a deployment device. The elongate structure may have a first end and a second end. The first end may be connected to a tail section of an aircraft. The deployment device may be connected to the elongate structure. The deployment device may be configured to move such that a distance between the second end of the elongate structure and a bottom of the tail section of the aircraft changes to one of a plurality of selected distances.

In yet another illustrative example, a method for positioning a tail skid assembly for a maximum rotation angle for an aircraft may be provided. A determination may be made as to whether the tail skid assembly is to be deployed for takeoff or landing. A set of parameters may be identified based on the determination of whether the tail skid assembly is to be deployed for takeoff or landing. A desired maximum rotation angle for the aircraft may be identified using the set of parameters. The tail skid assembly may be deployed to allow the desired maximum rotation angle.

In still yet another illustrative example, a method for positioning a tail skid assembly for a maximum rotation angle for an aircraft may be provided. A determination may be made as to whether the tail skid assembly is to be deployed for takeoff or landing. A set of parameters may be identified based on a determination of whether the tail skid assembly is to be deployed for takeoff or landing. A desired maximum rotation angle for the aircraft may be identified using the set of parameters. A deployment device in the tail skid assembly may be moved to change a deployed position for an elongate structure in the tail skid assembly. The elongate structure may have a first end and a second end in which the first end is connected to a tail section of the aircraft. Changing the deployed position for the elongate structure may change a distance between the second end of the elongate structure and a bottom of the tail section of the aircraft to allow the desired maximum rotation angle for the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 10 is an illustration of a side view of an aircraft with a tail skid assembly in contact with a surface in accordance with an illustrative embodiment;

FIG. 12 is an illustration of a side view of an aircraft with a tail skid assembly in contact with a surface in accordance with an illustrative embodiment;

DETAILED DESCRIPTION

The different illustrative embodiments recognize and take into account different considerations. For example, the different illustrative embodiments recognize and take into account that a tail skid assembly that allows an aircraft to have a maximum rotation angle during landing that is greater than a maximum rotation angle during takeoff may be desirable. Further, the different illustrative embodiments recognize and take into account that a tail skid assembly that does not add undesired weight, undesired complexity, undesired load paths, and/or increased maintenance costs to the aircraft may be desirable.

Thus, the different illustrative embodiments provide a method and apparatus for changing a deployed position for an elongate structure in a tail skid assembly for an aircraft between takeoff and landing. In one illustrative example, a tail skid assembly may comprise an elongate structure and a deployment device. The elongate structure may be connected to a tail section of an aircraft. The deployment device may be connected to the elongate structure. The deployment device may be configured to move such that a deployed position for the elongate structure changes to one of a plurality of deployed positions for the elongate structure.

Figure 1:
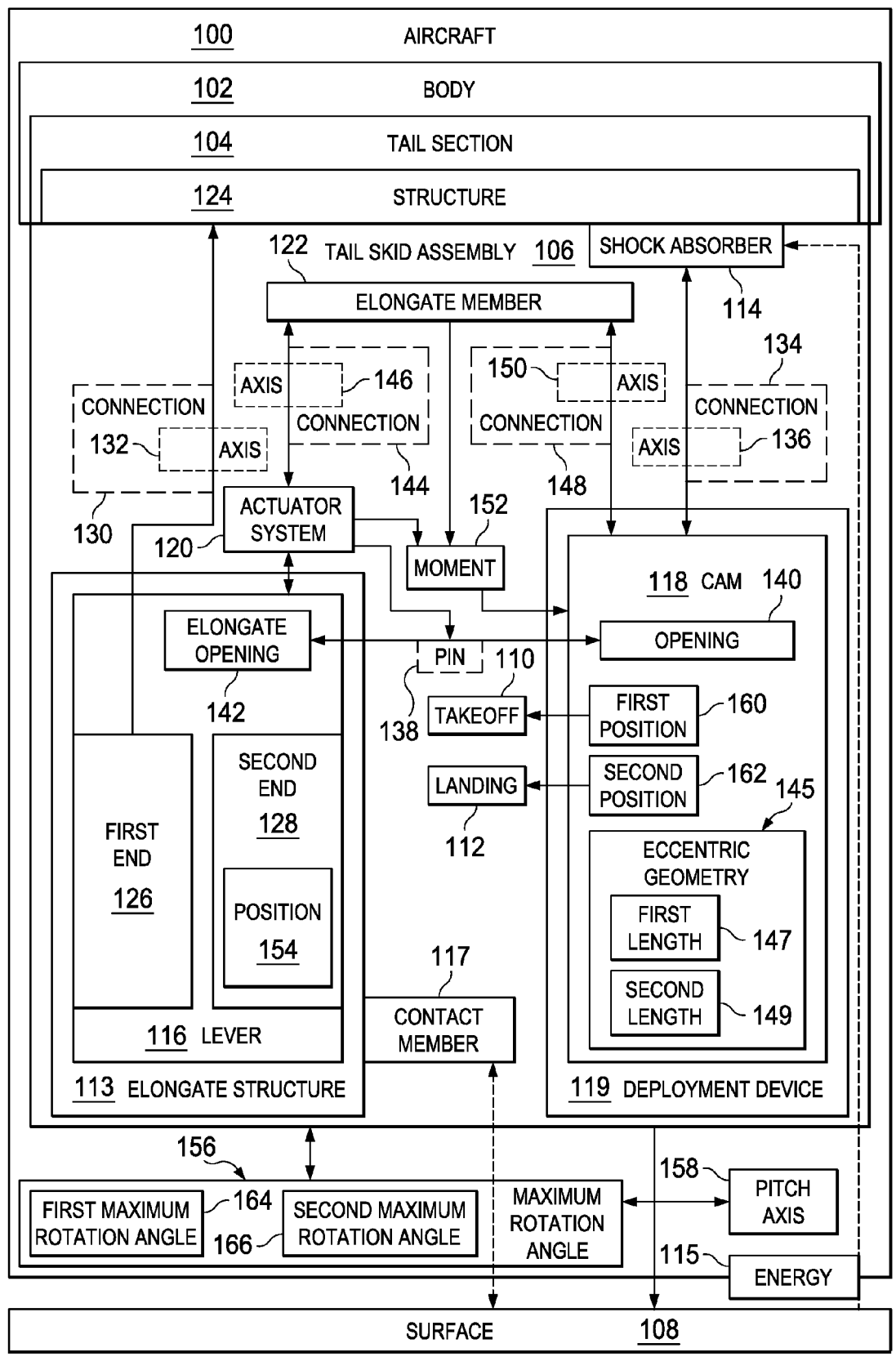
FIG. 1 is an illustration of a block diagram of a tail skid assembly for an aircraft in the form of a block diagram in accordance with an illustrative embodiment.

With reference now to the figures and, in particular, with reference to FIG. 1, an illustration of a tail skid assembly for an aircraft in the form of a block diagram is depicted in accordance with an illustrative embodiment. As depicted, aircraft 100 may have body 102 with tail section 104.

In these illustrative examples, tail skid assembly 106 may be connected to tail section 104. As used herein, when one component may be "connected" to another component, this connection is a physical association. For example, a first component, such as tail skid assembly 106, may be considered to be connected to a second component, such as tail section 104 of aircraft 100, by being secured to the second component, bonded to the second component, mounted to the second component, welded to the second component, fastened to the second component, and/or connected to the second component in some other suitable manner.

Further, the first component may be directly or indirectly connected to the second component. In other words, additional components may be present between the first component and the second component. The first component may be considered to be indirectly connected to the second component when one or more additional components are present between the two components. When the first component is directly connected to the second component, no additional components may be present between the two components. In some cases, the first component may also be connected to the second component by being formed as part of and/or as an extension of the second component.

Tail skid assembly 106 may be configured to substantially prevent tail section 104 of aircraft 100 from contacting surface 108 during at least one of takeoff 110, landing 112, and some other suitable phase of flight for aircraft 100. Surface 108 may be any surface on which aircraft 100 may perform landing 112 or from which aircraft 100 may perform takeoff 110. For example, without limitation, surface 108 may be the surface of a runway, a grassy surface, a concrete surface, a snow-covered surface, a surface onboard a ship, or some other suitable type of surface.

In these illustrative examples, tail skid assembly 106 may comprise shock absorber 114, elongate structure 113, contact member 117, deployment device 119, actuator system 120, and elongate member 122. Shock absorber 114 may be any device configured to absorb and/or dissipate energy 115 resulting from impact. In particular, shock absorber 114 may be configured to smooth out shock resulting from impact and dissipate energy 115. Energy 115 may comprise kinetic energy in these examples.

Further, in these illustrative examples, elongate structure 113 may take the form of lever 116. In some cases, lever 116 may be considered a "tail skid" for tail skid assembly 106. Additionally, deployment device 119 may take the form of cam 118 in these examples.

Shock absorber 114 and lever 116 may be connected to tail section 104 of aircraft 100. In one illustrative example, lever 116 and shock absorber 114 may each be connected to structure 124 in tail section 104 of aircraft 100. Structure 124 may take the form of, for example, without limitation, a structural panel, an intercostal, a mechanical device, or some other suitable type of structure.

As depicted, lever 116 may have first end 126 and second end 128. First end 126 may be connected to structure 124 in tail section 104 of aircraft 100 at connection 130. As used herein, a "connection", such as connection 130, may comprise any number of fasteners, pins, hinges, openings, and/or other suitable components for connecting a first component, such as lever 116, to a second component, such as structure 124.

Further, a "connection" between a first component and a second component, as used herein, may allow the first component and/or the second component to rotate about an axis through the connection. For example, second end 128 of lever 116 may rotate about axis 132 through connection 130. Axis 132 may be a fixed axis of rotation in these illustrative examples.

Additionally, contact member 117 may be associated with second end 128 of lever 116 in these illustrative examples. As used herein, when one component is "associated" with another component, this association may be a physical association. For example, a first component, such as contact member 117, may be considered to be associated with a second component, such as lever 116, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In one illustrative example, contact member 117 may be a separate component configured for attachment to second end 128 of lever 116. Of course, in other illustrative examples, contact member 117 may be part of lever 116. Contact member 117 may be configured for contact with surface 108. In particular, contact member 117 may come into contact with surface 108 prior to the underside of tail section 104 contacting surface 108.

Contact member 117 may take various forms. In these depicted examples, contact member 117 may take the form of a "shoe". However, in other illustrative examples, contact member 117 may take the form of, for example, without limitation, a cover, a roller, a skid plate, a cap, or some other suitable type of member selected for contact with surface 108. Contact member 117 may be removable and replaceable in these illustrative examples.

Cam 118 may be connected to shock absorber 114 at connection 134. More specifically, cam 118 may be rotatably connected to shock absorber 114 at connection 134 such that cam 118 may rotate about axis 136 through connection 134.

Further, cam 118 may also be connected to lever 116. Cam 118 may be located between shock absorber 114 and lever 116 in these examples. In one illustrative example, pin 138 may be used to connect cam 118 to lever 116. For example, without limitation, pin 138 may be inserted through opening 140 in cam 118 and into elongate opening 142 in lever 116.

Pin 138, with cam 118 connected to pin 138, may be moved in a substantially linear direction through elongate opening 142 by actuator system 120. Actuator system 120 may attach to pin 138. In this manner, actuator system 120 may be indirectly connected to cam 118. Movement of pin 138 by actuator system 120 causes cam 118 to move. Actuator system 120 also may be connected to lever 116 in these examples.

Actuator system 120 may comprise one or more actuators. In these illustrative examples, actuator system 120 may take the form of a hydraulic actuator configured to move pin 138 through elongate opening 142 in a substantially linear direction. Of course, in other illustrative examples, actuator system 120 may comprise at least one of a hydraulic actuator, a linear actuator, a pneumatic actuator, and some other suitable type of actuator.

Elongate member 122 may be connected to actuator system 120 at connection 144. Elongate member 122 may be configured to rotate about axis 146 through connection 144. Further, elongate member 122 may be connected to cam 118 at connection 148. Cam 118 may be configured to rotate about axis 150 through connection 148.

In these illustrative examples, elongate member 122 may have a fixed length and may remain substantially rigid when actuator system 120 is operated. Elongate member 122 may take the form of, for example, without limitation, a rod, a reaction link, a support beam, or some other suitable type of elongate member.

When actuator system 120 is operated to move pin 138 through elongate opening 142, elongate member 122 connected to both actuator system 120 and cam 118 may create moment 152. Moment 152 may cause cam 118 to rotate about axis 136 through connection 134 between shock absorber 114 and cam 118. In particular, moment 152 may cause cam 118 to rotate about axis 136 through connection 134 without rotating shock absorber 114 outside of selected tolerances.

As depicted, cam 118 may have eccentric geometry 145. In other words, cam 118 may have first length 147 that is different from second length 149 for cam 118. In these illustrative examples, first length 147 and second length 149 may each intersect axis 136 through connection 134. In some cases, first length 147 and second length 149 may be substantially orthogonal to each other.

Rotation of cam 118 having eccentric geometry 145 about axis 136 through connection 134 may change a position of lever 116 relative to connection 134. In particular, rotation of cam 118 may change position 154 of second end 128 of lever 116 relative to connection 134. For example, without limitation, rotation of cam 118 may move second end 128 of lever 116 closer to or further away from connection 134.

Changing position 154 of second end 128 of lever 116 may change maximum rotation angle 156 for aircraft 100. In these illustrative examples, maximum rotation angle 156 may be the maximum angle at which aircraft 100 may be rotated about pitch axis 158 before contact member 117 at second end 128 of lever 116 comes into contact with surface 108 during takeoff 110 or landing 112. First length 147 and second length 149 may be selected such that maximum rotation angle 156 may be changed between takeoff 110 and landing 112 by a desired amount.

Cam 118 may be rotated such that a deployed position for lever 116 changes to one of a plurality of deployed positions for lever 116. In this manner, lever 116 may have two or more possible deployed positions when tail skid assembly 106 is deployed.

As one illustrative example, cam 118 may be rotated to one of first position 160 relative to lever 116 and second position 162 relative to lever 116. First position 160 may be for takeoff 110, and second position 162 may be for landing 112. Cam 118 may be rotated to first position 160 such that lever 116 has a first deployed position. Cam 118 may be rotated to second position 162 such that lever 116 has a second deployed position.

In these illustrative examples, when lever 116 has the first deployed position, tail skid assembly 106 may be considered as having a first deployed position. Further, when lever 116 has the second deployed position, tail skid assembly 106 may be considered as having a second deployed position. In this manner, changing a deployed position for lever 116 may be considered changing a deployed position for tail skid assembly 106.

Further, in these depicted examples, rotation of cam 118 changes a distance between second end 128 of lever 116 and a bottom of tail section 104 of aircraft 100 to one of a plurality of selected distances. Each selected distance in this plurality of selected distances may be selected to provide a different maximum rotation angle for aircraft 100 when tail skid assembly 106 is deployed. As the distance between second end 128 of lever 116 and the bottom of tail section 104 of aircraft 100 decreases, the maximum rotation angle allowed for aircraft 100 increases.

For example, without limitation, when lever 116 has the first deployed position, contact member 117 at second end 128 of lever 116 may have a first distance from tail section 104 of aircraft 100. When lever 116 has the second deployed position, contact member 117 may have a second distance from tail section 104 of aircraft 100. The first distance between contact member 117 and tail section 104 may be greater than the second distance between contact member 117 and tail section 104. Rotating cam 118 between first position 160 and second position 162 may change maximum rotation angle 156 for aircraft 100.

When cam 118 is in first position 160, aircraft 100 may have first maximum rotation angle 164 for takeoff 110. When cam 118 is in second position 162, aircraft 100 may have second maximum rotation angle 166 for landing 112.

Second maximum rotation angle 166 may be greater than first maximum rotation angle 164 in this illustrative example. For example, without limitation, second maximum rotation angle 166 may be greater than first maximum rotation angle 164 by about one degree.

Consequently, when cam 118 is rotated to second position 162 for landing 112, aircraft 100 may be rotated about pitch axis 158 to a greater degree before contact member 117 contacts surface 108 as compared to when cam 118 is rotated to first position 160. A smaller distance between contact member 117 and tail section 104 of aircraft 100 may allow a greater maximum rotation angle for aircraft 100 as compared to a greater distance between contact member 117 and tail section 104 of aircraft 100.

In this manner, the different illustrative embodiments provide tail skid assembly 106 configured to change maximum rotation angle 156 for aircraft 100 between takeoff 110 and landing 112. Further, the different illustrative embodiments may provide an apparatus for changing maximum rotation angle 156 that does not increase the weight and/or cost of aircraft 100 more than desired.

The illustration of tail skid assembly 106 in aircraft 100 in FIG. 1 is not meant to imply physical or architectural limitations to the manner in which an illustrative embodiment may be implemented. Other components in addition to or in place of the ones illustrated may be used. Some components may be unnecessary. Also, the blocks may be presented to illustrate some functional components. One or more of these blocks may be combined, divided, or combined and divided into different blocks when implemented in an illustrative embodiment.

For example, although deployment device 119 has been described as cam 118, deployment device 119 may take other forms. In some illustrative examples, deployment device 119 may take the form of a planar member, an electromechanical device, a structure comprising one or more components, or some other suitable type of structure or device configured to be rotated by operation of actuator system 120 and configured to change a deployed position for elongate structure 113 when rotated.

Further, elongate structure 113 may take some form other than lever 116. For example, without limitation, elongate structure 113 may be a rod, a beam, a tube, an electromechanical device, or some other suitable type of elongate structure.

With reference now to FIGS. 2-13, illustrations of a tail skid assembly for an aircraft are depicted in accordance with an illustrative embodiment. In FIGS. 2-13, an example of one implementation for a tail skid assembly for an aircraft may be depicted. The tail skid assembly described in FIGS. 2-13 may be an example of one implementation for tail skid assembly 106 for aircraft 100 in FIG. 1.

Figure 2:
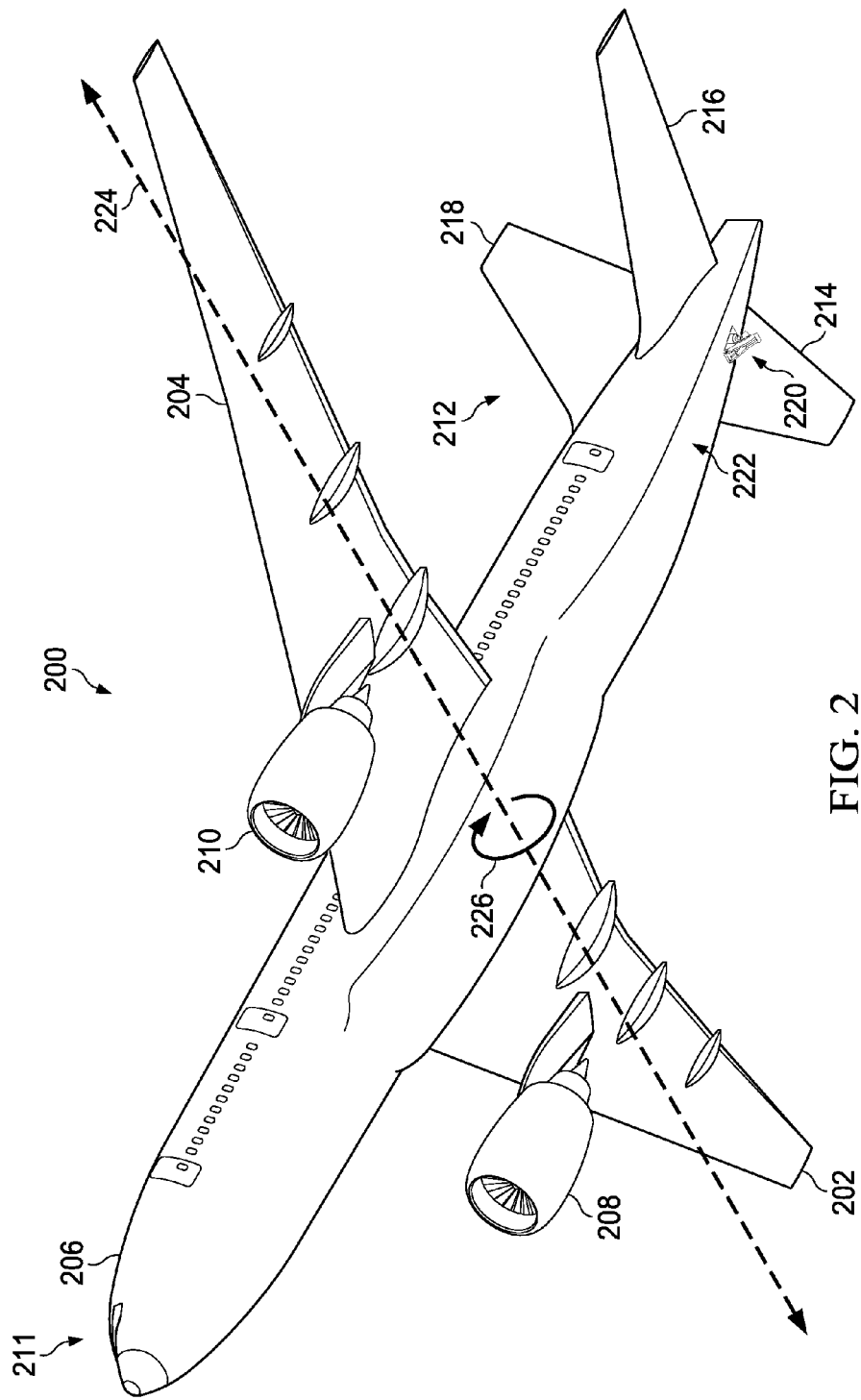
FIG. 2 is an illustration of a tail skid assembly for an aircraft in accordance with an illustrative embodiment.

With reference now to FIG. 2, an illustration of an aircraft is depicted in accordance with an illustrative embodiment. In this illustrative example, aircraft 200 may have wing 202 and wing 204 attached to fuselage 206. Further, aircraft 200 may include engine 208 attached to wing 202 and engine 210 attached to wing 204.

Fuselage 206 may have nose section 211 and tail section 212. Horizontal stabilizer 214, horizontal stabilizer 216, and vertical stabilizer 218 may be attached to tail section 212 of fuselage 206. Further, tail skid assembly 220 may be attached to underside 222 of tail section 212 of fuselage 206. Tail skid assembly 220 may be an example of one implementation for a tail skid assembly in accordance with the different illustrative embodiments.

Tail skid assembly 220 may be configured to substantially prevent tail section 212 of aircraft 200 from contacting a surface (not shown) when aircraft 200 rotates about pitch axis 224. For example, without limitation, aircraft 200 may rotate about pitch axis 224 when aircraft 200 takes off and lands. In particular, aircraft 200 may rotate in the direction of arrow 226 about pitch axis 224 during takeoff and landing.

When aircraft 200 rotates about pitch axis 224 in the direction of arrow 226, nose section 211 of aircraft 200 may be moved upwards, while tail section 212 of aircraft 200 may be moved downwards. During takeoff, tail section 212 may be moved closer to the surface from which aircraft 200 is taking off. During landing, tail section 212 may be moved closer to the surface on which aircraft 200 is landing. Tail skid assembly 220 may be used to substantially prevent tail section 212 from contacting these surfaces during takeoff and landing.

Figure 3:
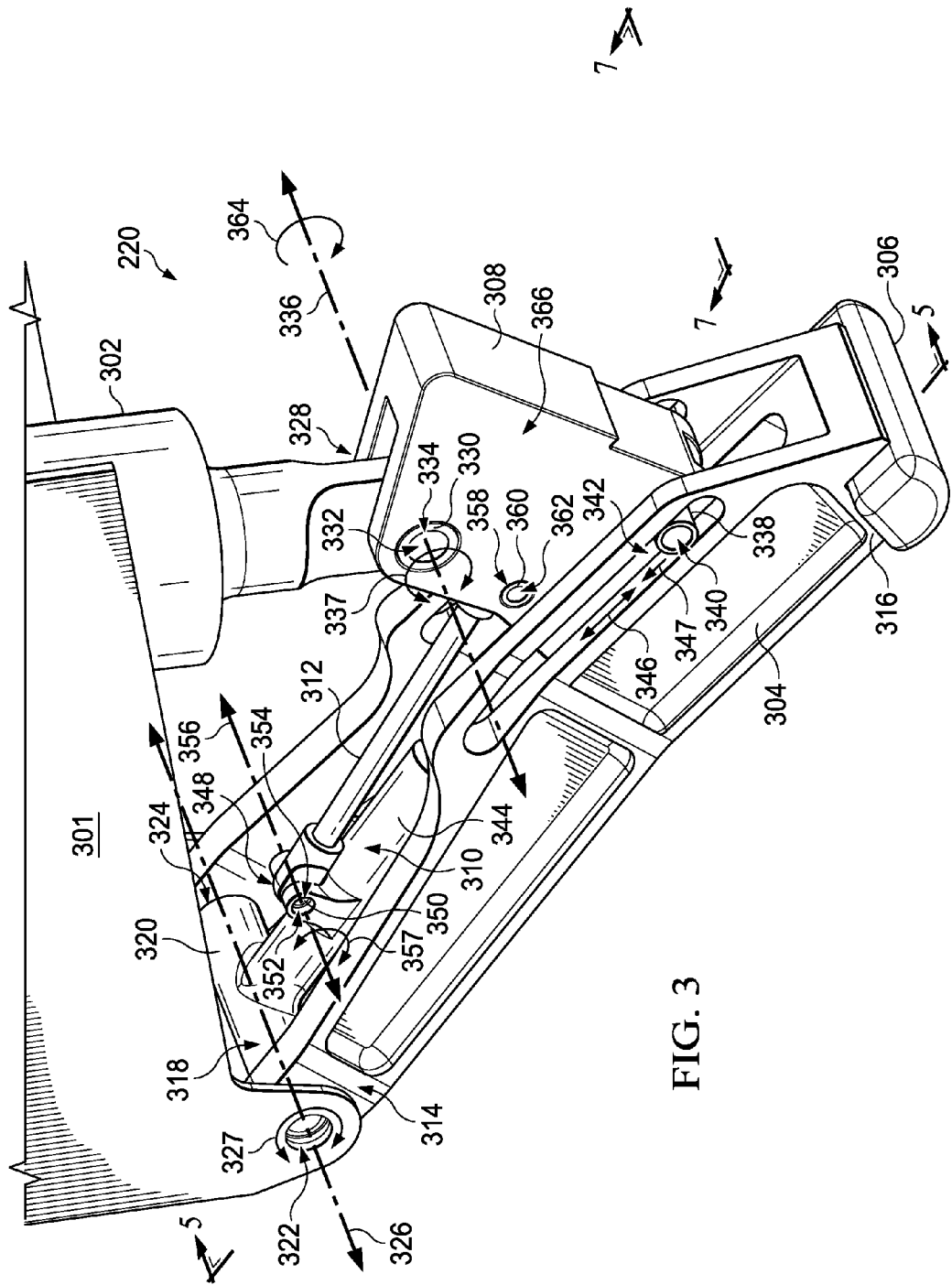
FIG. 3 is an illustration of a perspective view of a tail skid assembly in accordance with an illustrative embodiment.

Turning now to FIG. 3, an illustration of a perspective view of tail skid assembly 220 is depicted in accordance with an illustrative example. In this illustrative example, tail skid assembly 220 is connected to structure 301. Structure 301 may be a structure in tail section 212 in FIG. 2. In particular, structure 301 may be an intercostal in this depicted example.

Tail skid assembly 220 may include shock absorber 302, lever 304, contact member 306, cam 308, actuator system 310, and elongate member 312. As depicted, shock absorber 302 and lever 304 may be connected to structure 301.

Lever 304 may have first end 314 and second end 316. First end 314 may be rotatably connected to structure 301 at connection 318. As depicted, connection 318 may include pin 320 inserted through opening 322 of structure 301 and opening 324 at first end 314 of lever 304. Second end 316 of lever 304 may be configured to rotate about axis 326 through connection 318 in the direction of arrow 327. Further, contact member 306 may be attached to second end 316 of lever 304. In this illustrative example, contact member 306 may be referred to as a "shoe".

Additionally, cam 308 may be rotatably connected to shock absorber 302 at connection 328. Connection 328 may include pin 330 inserted through opening 332 in shock absorber 302 and opening 334 in cam 308. Cam 308 may rotate about axis 336 through connection 328 in the direction of arrow 337.

Further, cam 308 may also be connected to lever 304. Pin 338 may connect cam 308 to lever 304. As depicted, pin 338 may extend through opening 340 in cam 308 and into elongate opening 342 in lever 304.

In this illustrative example, actuator system 310 may be connected to pin 338. Actuator system 310 may be hydraulic actuator 344 in this depicted example. Operation of actuator system 310 may cause pin 338 to move in the direction of arrow 346. In other words, actuator system 310 may move pin 338 in a substantially linear direction along arrow 346.

Elongate member 312 may be connected to actuator system 310 at connection 348. Connection 348 may include pin 350 inserted through opening 352 of elongate member 312 and opening 354 in actuator system 310. Elongate member 312 may be rotated about axis 356 through connection 348 in the direction of arrow 357. In this illustrative example, elongate member 312 may be referred to as a "reaction link".

Elongate member 312 may also be connected to cam 308 at connection 358. Connection 358 may include pin 360 inserted through opening 362 of cam 308. In particular, elongate member 312 may be attached to pin 360. When actuator system 310 moves pin 338 through elongate opening 342 in the direction of arrow 347, the attachment between elongate member 312 and pin 360 in cam 308 may create moment 364.

Moment 364 may cause cam 308 to rotate about axis 336 through connection 328. Rotation of cam 308 about axis 336 may, in turn, cause a position of second end 316 of lever 304 to be changed. As depicted, cam 308 may be rotated to first position 366 relative to lever 304 for takeoff. In first position 366, second end 316 of lever 304 may be in a position that provides a desired maximum rotation angle for takeoff.

Figure 4:
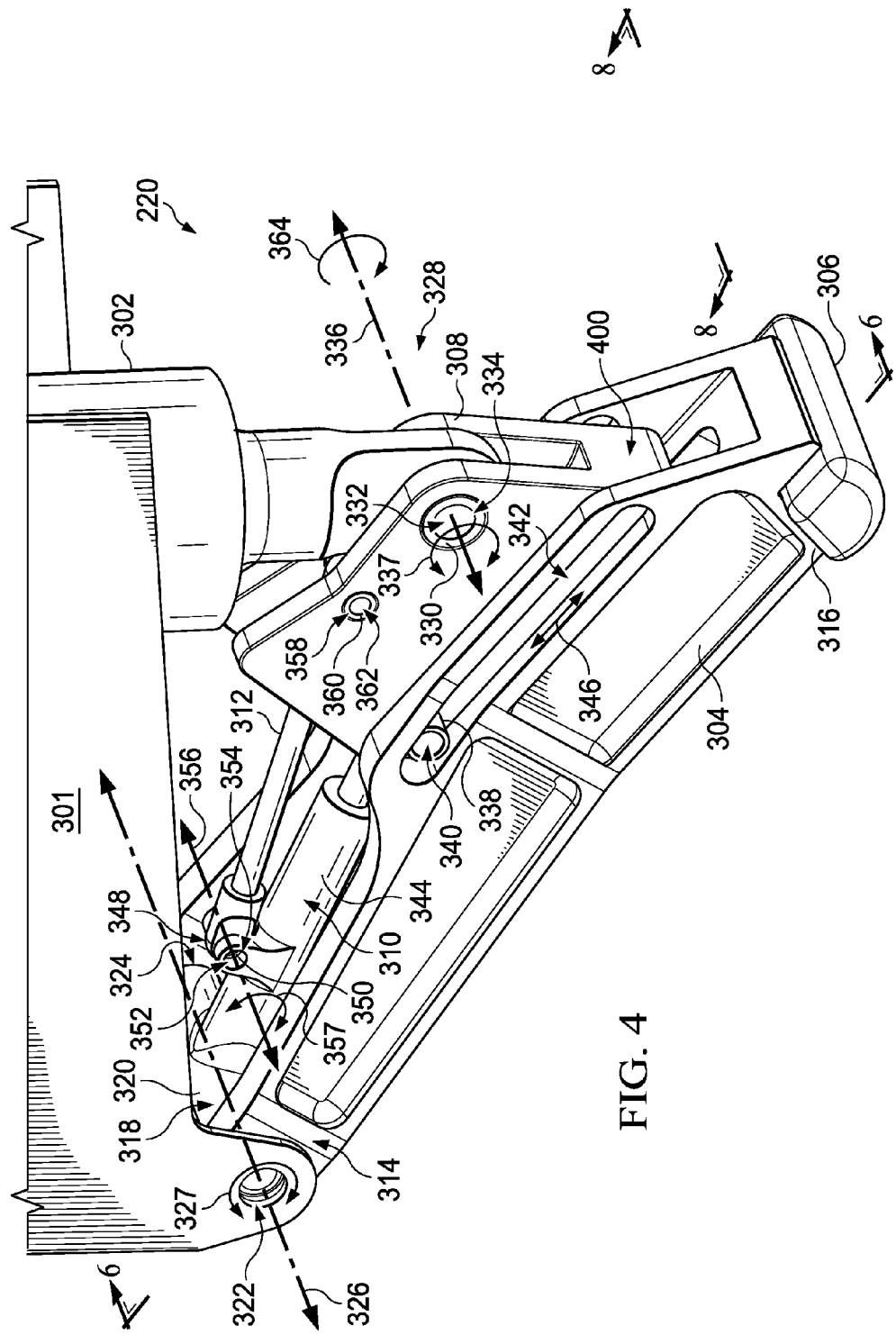
FIG. 4 is an illustration of a perspective view of a tail skid assembly in accordance with an illustrative embodiment.

With reference now to FIG. 4, an illustration of a perspective view of tail skid assembly 220 is depicted in accordance with an illustrative embodiment. In this illustrative example, actuator system 310 may move pin 338 such that cam 308 may be rotated about axis 336 through connection 328. As depicted, cam 308 may be rotated to second position 400 relative to lever 304 for landing.

In second position 400, second end 316 of lever 304 may be in a position that provides a desired maximum rotation angle for landing. The maximum rotation angle provided when cam 308 is in second position 400 may be greater than the maximum rotation angle provided when cam 308 is in first position 366 in FIG. 3.

Figure 5:
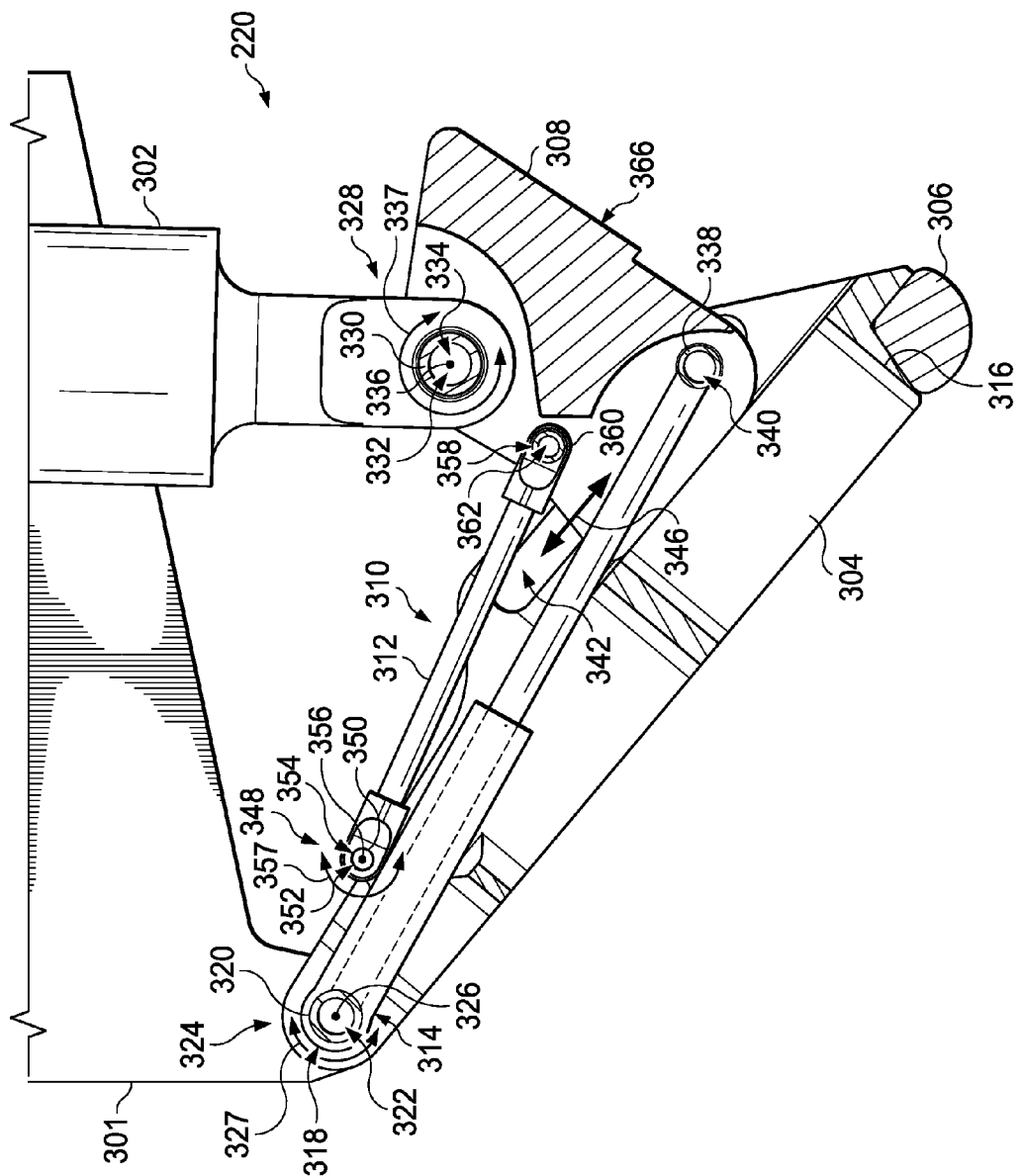
FIG. 5 is an illustration of a cross-sectional side view of a tail skid assembly in accordance with an illustrative embodiment.

With reference now to FIG. 5, an illustration of a cross-sectional side view of tail skid assembly 220 is depicted in accordance with an illustrative embodiment. As depicted, a cross-sectional side view of tail skid assembly 220 taken along lines 5-5 in FIG. 3 is seen in FIG. 5. Cam 308 may be in first position 366 for takeoff in this depicted example. This cross-sectional view may allow actuator system 310 connected to pin 338 and elongate member 312 connected to pin 360 at connection 358 to be seen more clearly.

Figure 6:
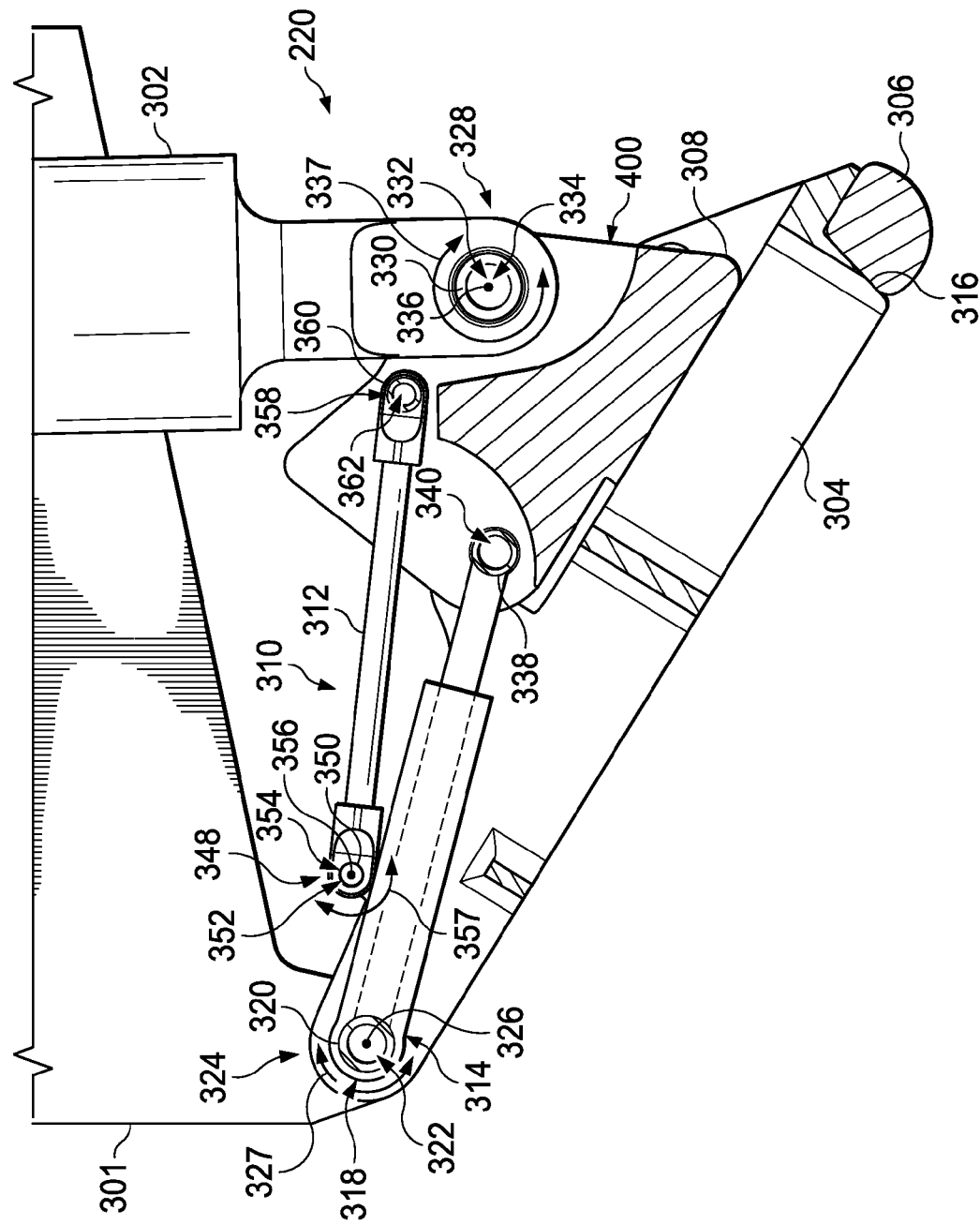
FIG. 6 is an illustration of a cross-sectional side view of a tail skid assembly in accordance with an illustrative embodiment.

With reference now to FIG. 6, an illustration of a cross-sectional side view of tail skid assembly 220 is depicted in accordance with an illustrative embodiment. As depicted, a cross-sectional side view of tail skid assembly 220 taken along lines 6-6 in FIG. 4 is seen in FIG. 6. Cam 308 may be in second position 400 for landing in this depicted example. This cross-sectional view may allow actuator system 310 connected to pin 338 and elongate member 312 connected to pin 360 at connection 358 to be seen more clearly.

Figure 7:
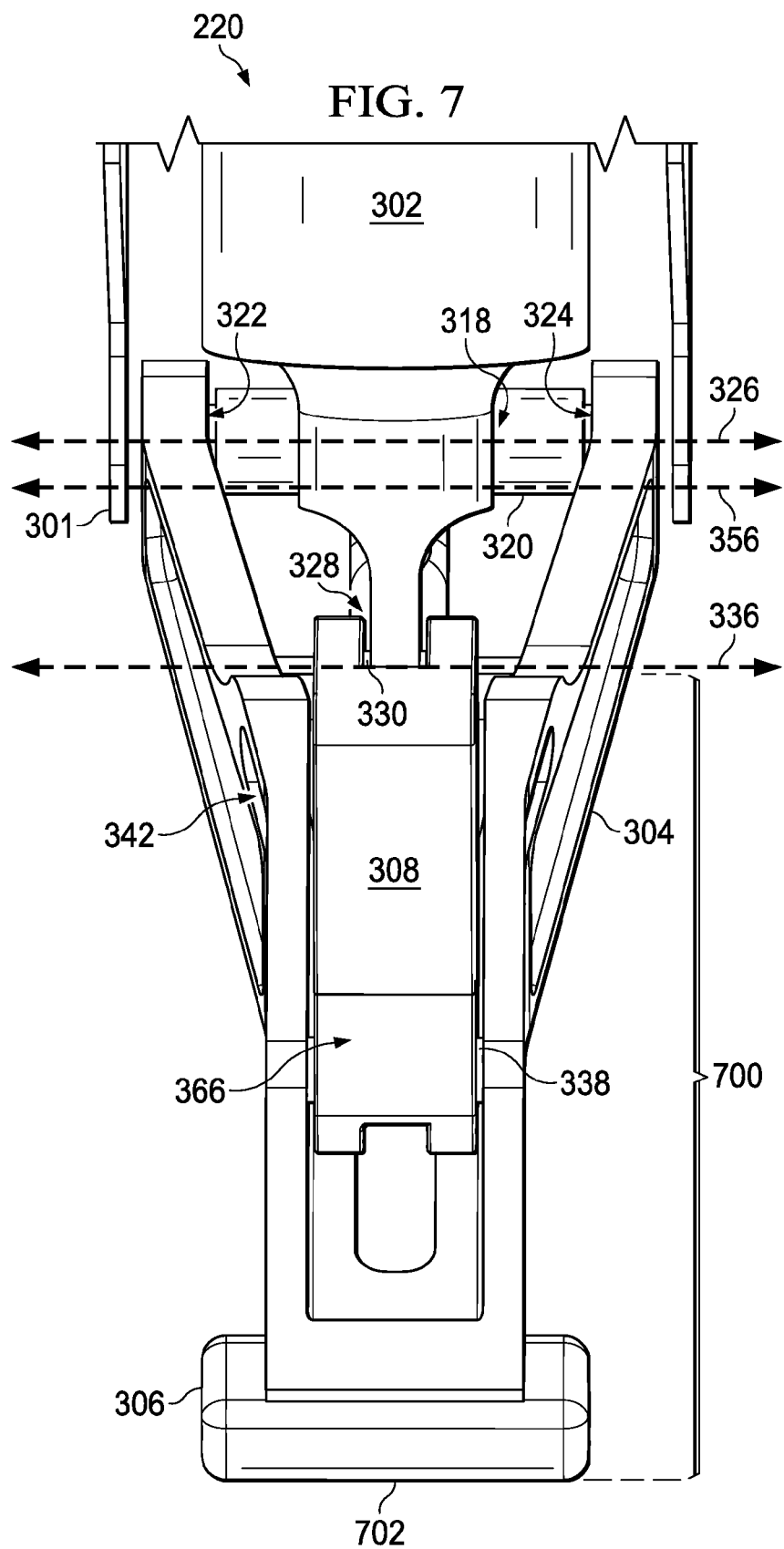
FIG. 7 is an illustration of an end view of a tail skid assembly in accordance with an illustrative embodiment.

With reference now to FIG. 7, an illustration of an end view of tail skid assembly 220 is depicted in accordance with an illustrative embodiment. In FIG. 7, an end view of tail skid assembly 220 with cam 308 in first position 366 for takeoff may be depicted taken with respect to lines 7-7 in FIG. 3.

In this illustrative example, distance 700 may be the distance between bottom 702 of contact member 306 and axis 336 through connection 328. Bottom 702 of contact member 306 may be the undermost portion of cam 308. In this manner, distance 700 may be an indication of the ground clearance provided by tail skid assembly 220 during takeoff.

Figure 8:
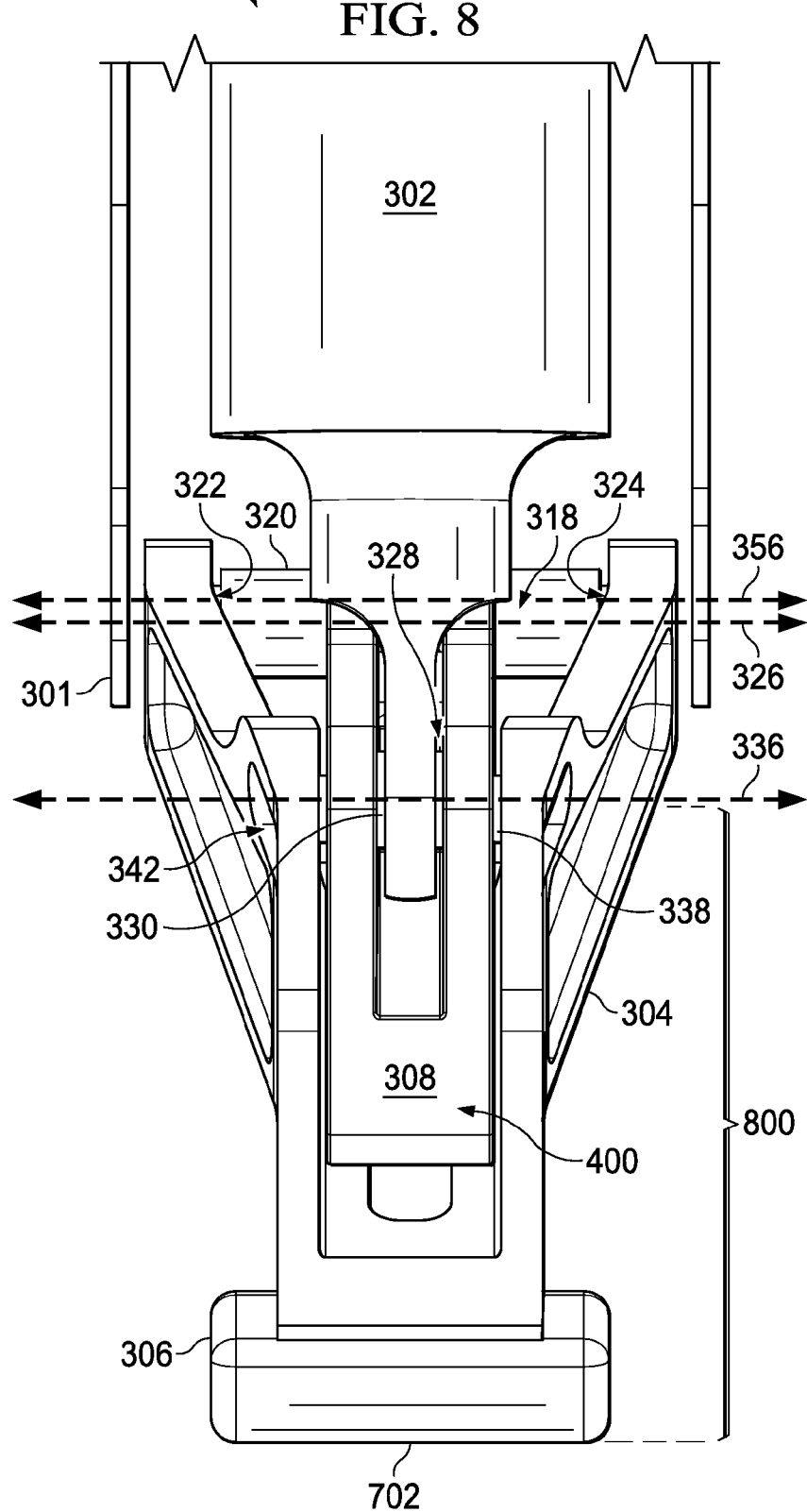
FIG. 8 is an illustration of an end view of a tail skid assembly in accordance with an illustrative embodiment.

With reference now to FIG. 8, an illustration of an end view of tail skid assembly 220 is depicted in accordance with an illustrative embodiment. In FIG. 8, an end view of tail skid assembly 220 with cam 308 in second position 400 for landing may be depicted taken with respect to lines 8-8 in FIG. 4.

In this illustrative example, distance 800 may be the distance between bottom 702 of contact member 306 and axis 336 through connection 328. Distance 800 may be an indication of the ground clearance provided by tail skid assembly 220 during landing. In this illustrative example, distance 700 in FIG. 7 may be greater than distance 800 in FIG. 8. In this manner, tail skid assembly 220 may provide a greater ground clearance during takeoff than during landing.

Figure 9:
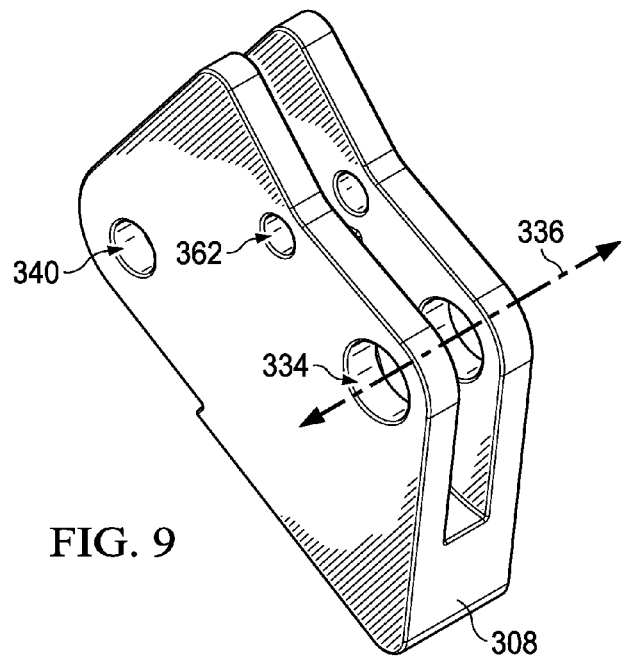
FIG. 9 is an illustration of an isometric view of a cam for a tail skid assembly in accordance with an illustrative embodiment.

With reference now to FIG. 9, an illustration of an isometric view of cam 308 for tail skid assembly 220 in FIGS. 2-8 is depicted in accordance with an illustrative embodiment. In this illustrative example, cam 308 may be depicted without any of the other components for tail skid assembly 220 to allow cam 308 to be more clearly seen. In particular, opening 334, opening 340, and opening 362 in cam 308 may be more clearly seen.

With reference now to FIG. 10, an illustration of a side view of aircraft 200 with tail skid assembly 220 in contact with a surface is depicted in accordance with an illustrative embodiment. In this illustrative example, aircraft 200 may be rotated about pitch axis 224 in FIG. 2 during takeoff from surface 1000.

Surface 1000 may be, for example, without limitation, the ground on a runway. During takeoff from surface 1000, tail skid assembly 220 may come into contact with surface 1000 to substantially prevent tail section 212 of aircraft 200 from contacting surface 1000.

Figure 11:
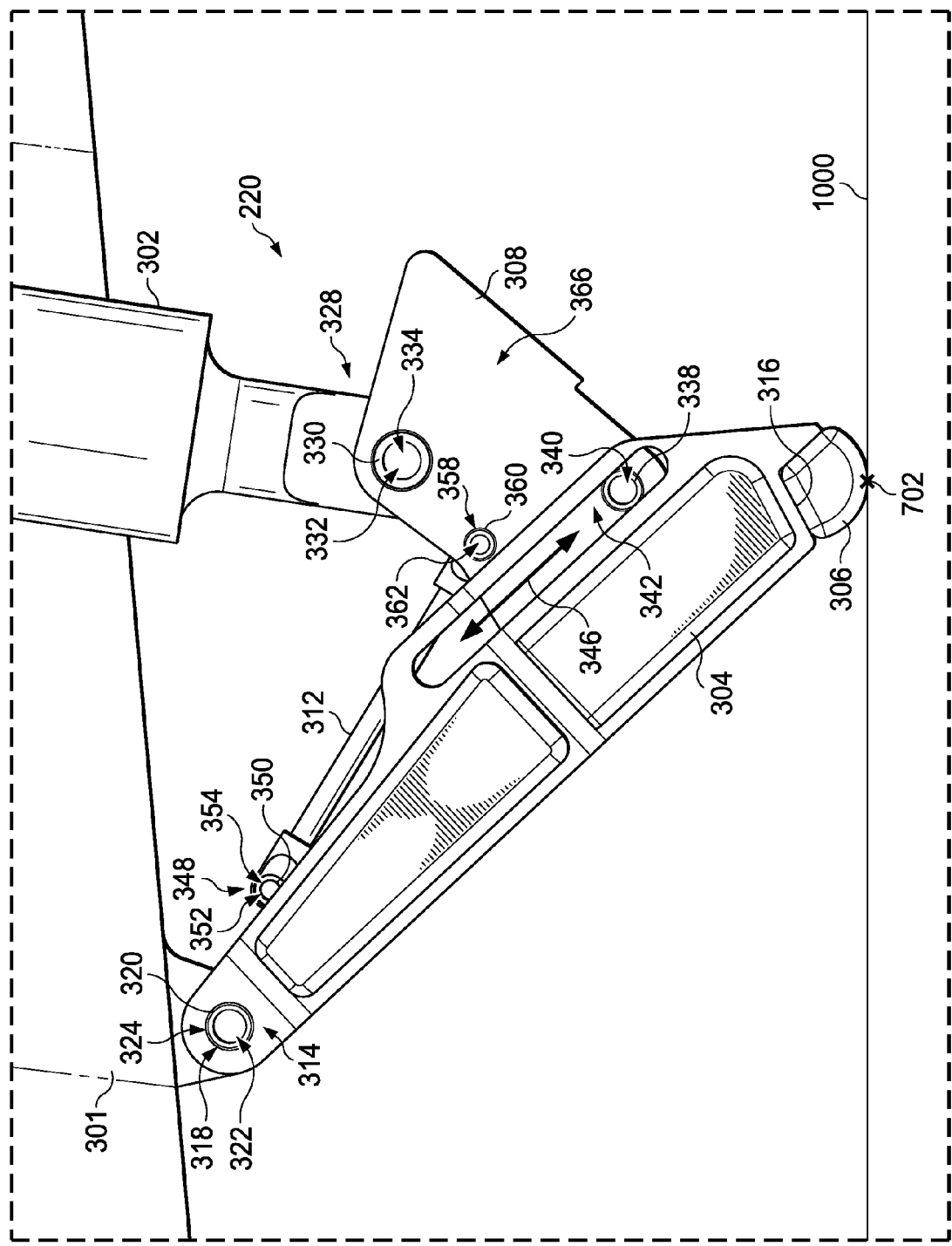
FIG. 11 is an illustration of an enlarged side view of a tail skid assembly in contact with a surface in accordance with an illustrative embodiment.

Turning now to FIG. 11, an illustration of an enlarged side view of tail skid assembly 220 in contact with surface 1000 is depicted in accordance with an illustrative embodiment. In FIG. 11, an enlarged side view of tail skid assembly 220 in contact with surface 1000 during takeoff in FIG. 10 may be depicted taken with respect to lines 11-11 in FIG. 10. As depicted in this example, cam 308 may be in first position 366 for takeoff.

With reference now to FIG. 12, an illustration of a side view of aircraft 200 with tail skid assembly 220 in contact with surface 1000 is depicted in accordance with an illustrative embodiment. In this illustrative example, aircraft 200 may be rotated about pitch axis 224 in FIG. 2 for landing on surface 1000. When landing on surface 1000, tail skid assembly 220 may come into contact with surface 1000 to substantially prevent tail section 212 of aircraft 200 from contacting surface 1000.

Figure 13:
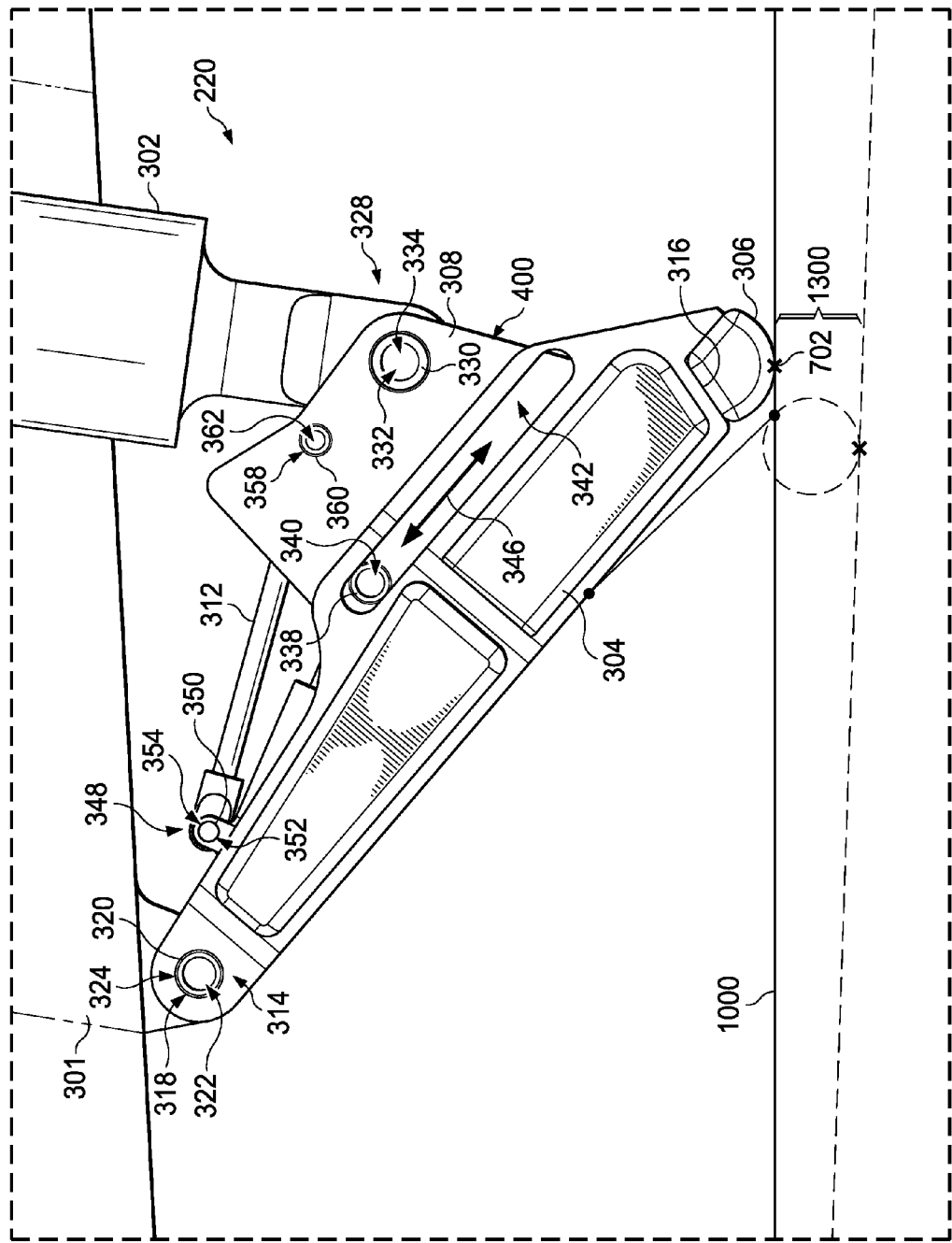
FIG. 13 is an illustration of an enlarged side view of a tail skid assembly in contact with a surface in accordance with an illustrative embodiment.

With reference now to FIG. 13, an illustration of an enlarged side view of tail skid assembly 220 in contact with surface 1000 is depicted in accordance with an illustrative embodiment. In FIG. 13, an enlarged side view of tail skid assembly 220 in contact with surface 1000 during landing in FIG. 12 may be depicted taken with respect to lines 13-13 in FIG. 12. As depicted in this example, cam 308 may be in second position 400 for landing.

In this illustrative example, clearance 1300 may be the additional ground clearance between surface 1000 and structure 301 that may be provided by tail skid assembly 220 when cam 308 is in first position 366, such as first position 366 for cam 308 in FIG. 11. As depicted, second position 400 of cam 308 may provide less clearance between surface 1000 and structure 301 during landing as compared to first position 366 of cam 308 during takeoff.

In other words, using tail skid assembly 220, aircraft 200 in FIG. 2 may have a greater maximum rotation angle during landing as compared to takeoff. This additional amount of rotation may allow aircraft 200 to reduce a speed of aircraft 200 during landing to a desired level.

Figure 14:
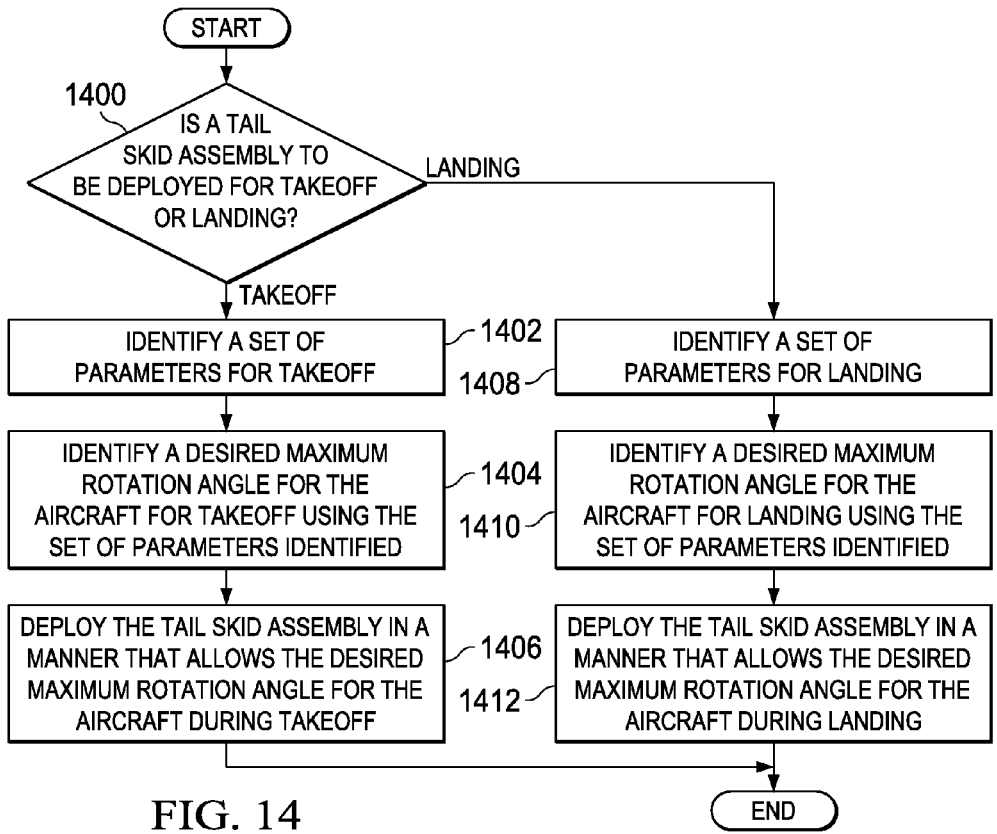
FIG. 14 is an illustration of a flowchart of a process for positioning a tail skid assembly for a maximum rotation angle for an aircraft in the form of a flowchart in accordance with an illustrative embodiment.

With reference now to FIG. 14, an illustration of a process for positioning a tail skid assembly for a maximum rotation angle for an aircraft in the form of a flowchart is depicted in accordance with an illustrative embodiment. The process illustrated in FIG. 14 may be implemented using tail skid assembly 106 having cam 118 in FIG. 1.

The process may begin by determining whether tail skid assembly 106 is to be deployed for takeoff 110 or landing 112 (operation 1400). If the tail skid assembly 106 is to be deployed for takeoff 110, the process identifies a set of parameters for takeoff 110 (operation 1402). In operation 1402, the set of parameters for takeoff 110 may include at least one of a takeoff field length, a length of the aircraft, a weight of the aircraft, a thrust generated by an engine system of the aircraft, a takeoff speed, a ground clearance requirement, safety requirements, and other suitable parameters for takeoff 110.

Thereafter, the process may identify a desired maximum rotation angle for aircraft 100 for takeoff 110 using the set of parameters identified (operation 1404). The desired maximum rotation angle for takeoff 110 may be first maximum rotation angle 164.

The process may then deploy tail skid assembly 106 in a manner that allows the desired maximum rotation angle for aircraft 100 during takeoff 110 (operation 1406), with the process terminating thereafter. In operation 1406, deploying tail skid assembly 106 to provide first maximum rotation angle 164 for aircraft 100 includes moving deployment device 119 in tail skid assembly 106 to first position 160.

With deployment device 119 in first position 160, elongate structure 113 in tail skid assembly 106 may have a first deployed position. The first deployed position for elongate structure 113 may provide a distance between second end 128 of elongate structure 113 and a bottom of tail section 104 of aircraft 100 that allows first maximum rotation angle 164.

With reference again to operation 1400, if tail skid assembly 106 is to be deployed for landing 112, the process identifies a set of parameters for landing 112 (operation 1408). In operation 1408, the set of parameters for landing 112 may include at least one of a landing field length, a length of the aircraft, a weight of the aircraft, a thrust generated by an engine system of the aircraft, a landing speed, a ground clearance requirement, safety requirements, and other suitable parameters for landing 112.

Thereafter, the process may identify a desired maximum rotation angle for aircraft 100 for landing 112 using the set of parameters identified (operation 1410). The desired maximum rotation angle for landing 112 may be second maximum rotation angle 166. Second maximum rotation angle 166 may be greater than first maximum rotation angle 164.

The process may then deploy tail skid assembly 106 in a manner that allows the desired maximum rotation angle for aircraft 100 during landing 112 (operation 1412), with the process terminating thereafter. In operation 1412, deploying tail skid assembly 106 to provide second maximum rotation angle 166 for aircraft 100 includes moving deployment device 119 in tail skid assembly 106 to second position 162.

With deployment device 119 in second position 162, elongate structure 113 in tail skid assembly 106 may have a second deployed position. The second deployed position for elongate structure 113 may provide a distance between second end 128 of elongate structure 113 and a bottom of tail section 104 of aircraft 100 that allows second maximum rotation angle 166.

When elongate structure 113 has the first deployed position, the distance between second end 128 of elongate structure 113 and a bottom of tail section 104 of aircraft 100 is greater than when elongate structure 113 has the second deployed position. In this manner, a greater ground clearance is provided for aircraft 100 during takeoff 110 as compared to landing 112.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, without limitation, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 15:
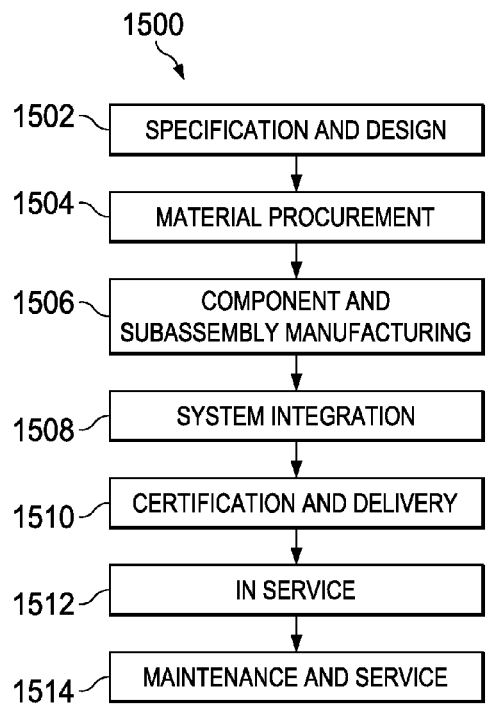
FIG. 15 is an illustration of an aircraft manufacturing and service method in accordance with an illustrative embodiment.
Figure 16:
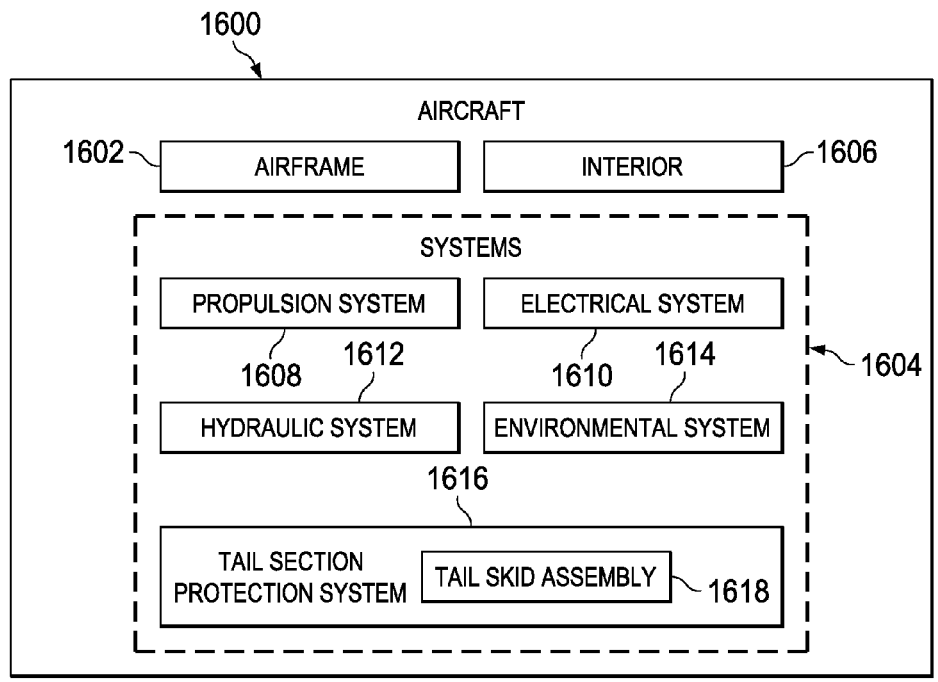
FIG. 16 is an illustration of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 may take place. Thereafter, aircraft 1600 may go through certification and delivery 1510 in order to be placed in service 1512. While in service 1512 by a customer, aircraft 1600 may be scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606.

Examples of systems 1604 may include one or more of propulsion system 1608, electrical system 1610, hydraulic system 1612, environmental system 1614, and tail section protection system 1616. Tail section protection system 1616 may include tail skid assembly 1618. Tail skid assembly 1618 may be implemented using, for example, without limitation, tail skid assembly 106 in FIG. 1. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. For example, without limitation, cam 118 in FIG. 1 may be added to tail skid assembly 1618 in aircraft 1600 to allow tail skid assembly 1618 to provide different maximum rotation angles for aircraft 1600 during different phases of flight.

For example, without limitation, cam 118 in FIG. 1 may be designed for use in tail skid assembly 1618 in aircraft 1600 during at least one of specification and design 1502 and routine maintenance and service 1514. Further, cam 118 in FIG. 1 may be added to tail skid assembly 1618 for aircraft 1600 during at least one of production, component and subassembly manufacturing 1506, system integration 1508, maintenance and service 1514, and some other suitable stage during aircraft manufacturing and service method 1500.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15.

One or more apparatus embodiments, method embodiments, or a combination thereof may be utilized while aircraft 1600 is in service 1512 and/or during maintenance and service 1514 in FIG. 15. The use of a number of the different illustrative embodiments may substantially expedite the assembly of and/or reduce the cost of aircraft 1600.

Thus, the different illustrative embodiments provide a method and apparatus for changing a deployed position for an elongate structure in a tail skid assembly for an aircraft. In one illustrative example, a tail skid assembly may comprise an elongate structure and a deployment device. The elongate structure may be connected to a tail section of an aircraft. The deployment device may be connected to the elongate structure. The deployment device may be configured to move such that a deployed position for the elongate structure changes to one of a plurality of deployed positions for the elongate structure.

The description of the different illustrative embodiments has been presented for purposes of illustration and description and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A tail skid assembly comprising:
an elongate structure connected to a tail section of an aircraft; and
a deployment device connected to the elongate structure, such that the elongate structure occupies one of a plurality of deployed positions; and
an actuator system connected: at a first end of the actuator system to the aircraft at an axis connecting a first end of the elongate structure to the aircraft, and at a second end of the actuator system to a pin connected to: the deployment device connected to an energy absorbing device, and an elongate opening in the elongate structure.

2. The tail skid assembly of claim 1, wherein the deployment device is configured to rotate between a first position relative to the elongate structure and a second position relative to the elongate structure such that the elongate structure has a first deployed position in the plurality of deployed positions when the deployment device is in the first position and the elongate structure has a second deployed position in the plurality of deployed positions when the deployment device is in the second position.

3. The tail skid assembly of claim 2, wherein the elongate structure further comprises a contact member associated with a second end of the elongate structure, the contact member configured to come into contact with a surface and being a first distance from the tail section of the aircraft with the elongate structure in the first deployed position, and a second distance from the tail section of the aircraft with the elongate structure in the second deployed position.

4. The tail skid assembly of claim 3, wherein the elongate structure has the first deployed position during takeoff and the elongate structure has the second deployed position during landing and wherein the first distance between the contact member and the tail section of the aircraft during takeoff is greater than the second distance between the contact member and the tail section of the aircraft during landing.

5. The tail skid assembly of claim 2, wherein the elongate structure in the first deployed position allows a first maximum rotation angle for the aircraft and wherein the elongate structure in the second deployed position allows a second maximum rotation angle for the aircraft.

6. The tail skid assembly of claim 5, wherein the elongate structure has the first deployed position during takeoff and the second deployed position during landing and wherein the second maximum rotation angle is greater than the first maximum rotation angle.

7. The tail skid assembly of claim 1 further comprising:
the actuator system configured to move the deployment device such that the deployment device rotates, wherein rotation of the deployment device changes the deployed position for the elongate structure.

8. The tail skid assembly of claim 7 further comprising:
the pin connecting the deployment device to the elongate structure being inserted through an opening in the deployment device and an elongate opening in the elongate structure; and the actuator system is configured to move the pin in the elongate opening such that the deployment device moves.

9. The tail skid assembly of claim 7 further comprising:
a reaction link connected to the actuator system and to the deployment device in which the reaction link creates a moment when the actuator system moves the deployment device and in which the moment causes the deployment device to rotate.

10. The tail skid assembly of claim 7, wherein the actuator system comprises at least one of a hydraulic actuator, a linear actuator, and a pneumatic actuator.

11. The tail skid assembly of claim 1, wherein the deployment device has an eccentric geometry in which a first length of the deployment device is different from a second length of the deployment device.

12. The tail skid assembly of claim 1, wherein the elongate structure is a lever and the deployment device is a cam.

13. The tail skid assembly of claim 1 further comprising:
the energy absorbing device connected to the tail section of the aircraft, the deployment device being connected to the energy absorbing device such that the deployment device rotates about an axis through a connection between the energy absorbing device and the deployment device.

14. The tail skid assembly of claim 13, wherein the connection between the deployment device and the energy absorbing device comprises at least one: of a fastener, a pin, an opening, and a hinge.

15. The tail skid assembly of claim 1, wherein movement of the deployment device changes the deployed position for the elongate structure to change a maximum rotation angle for the aircraft in which the maximum rotation angle for the aircraft is a maximum angle at which the aircraft can rotate about a pitch axis before the tail skid assembly contacts a surface during at least one of takeoff and landing.

16. A tail skid assembly comprising:
an elongate structure having a first end and a second end in which the first end is connected to a tail section of an aircraft; and
a deployment device connected to: an energy absorbing device, a reaction link, and an actuator system, and the elongate structure via a pin that connects the actuator system to the deployment device, and moves the deployment device such that a distance between the second end of the elongate structure and a bottom of the tail section of the aircraft becomes one of a plurality of selected distances.

17. The tail skid of claim 16, further comprising the reaction link configured to connect to the actuator system.

18. The tail skid of claim 16, further comprising a second pin configured to connect the actuator system and the elongate structure to the tail section of the aircraft.

19. The tail skid of claim 16, further comprising:
the deployment device configured to rotate about: an end of the energy absorbing device, an end of the reaction link; and,
the first end of the elongate structure and an end of the actuator system each rotatably connected to the tail section about an axis.

20. An apparatus configured to deploy a tail skid a distance from a body of an aerial vehicle, the apparatus comprising:
a deployment device comprising: eccentric geometry, a first opening, a second opening, and a third opening;
an energy absorbing device rotatably connected to the deployment device via a first pin through the first opening;
a reaction link rotatably connected, at a first end of the reaction link, to the deployment device via a second pin through the second opening, and rotatably connected, at a second end of the reaction link, to an actuator system;
the actuator system rotatably connected at a first end of the actuator system, to the deployment device via a third pin through the third opening, such that the third pin engages in an elongate opening in an elongate structure; and
the elongate structure connected: at a first end of the elongate structure to the vehicle via a fourth pin that connects a second end of the actuator system to the vehicle, and at a second end of the elongate structure to the tail skid.

* * * * *